United States Patent [19]

Muckenhirn et al.

[11] Patent Number: 5,430,504
[45] Date of Patent: Jul. 4, 1995

[54] BIFOCAL CONTACT LENSES

[75] Inventors: Dieter Muckenhirn, Au; Charles Debon, Staufen, both of Germany

[73] Assignee: Hecht Contactlinsen GmbH, Au, Germany

[21] Appl. No.: 923,222

[22] Filed: Jul. 31, 1992

[30] Foreign Application Priority Data

Aug. 2, 1991 [DE] Germany ......... 41 25 707.3

[51] Int. Cl.⁶ ............................... G02C 7/04
[52] U.S. Cl. ................... 351/161; 351/177
[58] Field of Search ........... 351/160 R, 160 H, 161, 351/162, 177

[56] References Cited

U.S. PATENT DOCUMENTS 3,913,274 10/1975 Raiford et al. ............ 51/58

FOREIGN PATENT DOCUMENTS 0248489 12/1987 European Pat. Off. .
2106499 10/1972 Germany .
3110624 10/1982 Germany .
674325 5/1990 Switzerland .
939016 10/1963 United Kingdom ............ 351/161
WO86/02462 4/1986 WIPO .

OTHER PUBLICATIONS

Mandell, R. B; "A No-Jump Bifocal Contact Lens"; Optometric Weekly; vol. 58, No. 22; Jun. 1, 1967; pp. 19-21.

Primary Examiner—Scott J. Sugarman
Attorney, Agent, or Firm—Donald Brown

[57] ABSTRACT

A device for manufacturing bifocal contact lenses is provided. It comprises a rotating head stock provided with an eccentric head supporting a lense holder for holding a lense blank. The lense holder is displaceable with respect to said eccentric head in a radial direction perpendicular to the axis of rotation. A sled is provided for supporting a cutting tool. Said sled pivotable around an axis which coincides with said axis of rotation and in addition displaceable to change the radii.

For avoiding a step which would result at the junction line dividing the distant vision segment and the near vision segment, a control is provided for adjusting the tool to a first radius R1 for cutting the distant vision segment and for adjusting said tool to a second radius R2 for cutting said near vision segment. After cutting the distant vision segment during a first operation, the near vision segment is cut during a second operation such that a continuous transition is achieved between both segments.

1 Claim, 3 Drawing Sheets

BIFOCAL CONTACT LENSES

BACKGROUND OF THE INVENTION

The present invention relates to a device for manufacturing bifocal contact lenses.

When manufacturing contract lenses using a device according to the state of the art, the surfaces of the near vision segment and the distant vision segment are coinciding in the center. However, adjacent to said center, a step-like junction line will result which is detrimental with respect to wearing comfort and appearance.

OBJECTS OF THE INVENTION

It is the object of the present invention to provide a device by which a bifocal contact lense having no step-like transition zone may be manufactured.

SUMMARY OF THE INVENTION

This object is achieved by a device as outlined in claim 1. A bifocal contact lense manufactured by such device is characterized in claim 4.

BRIEF DESCRIPTION OF THE DRAWINGS

Further features and advantages of the invention will result from the description of an embodiment with reference to the following figures.

DESCRIPTION OF PREFERRED EMBODIMENTS

Figure 2:
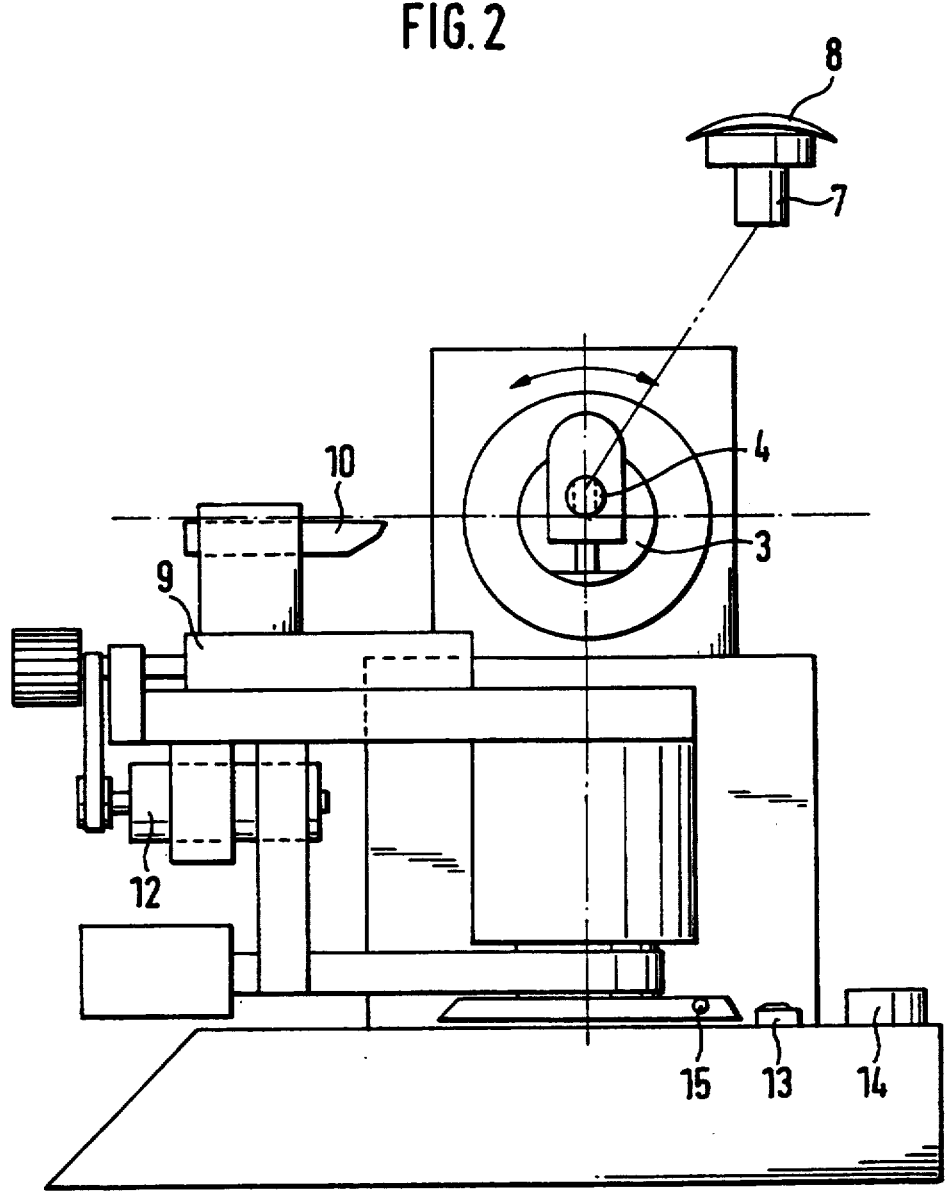
FIG. 2 is a side view of the device of FIG. 1.
Figure 5:
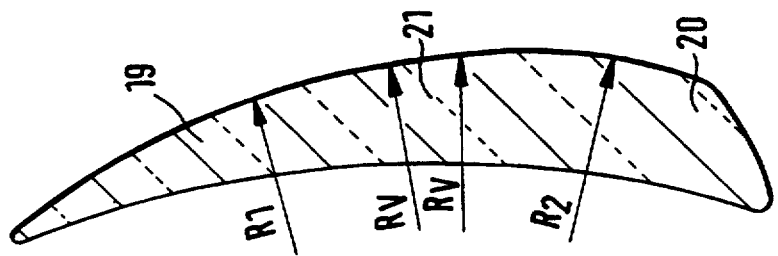
FIG. 5 is a vertical cross-section along line V—V of FIG. 3.
Figure 4:
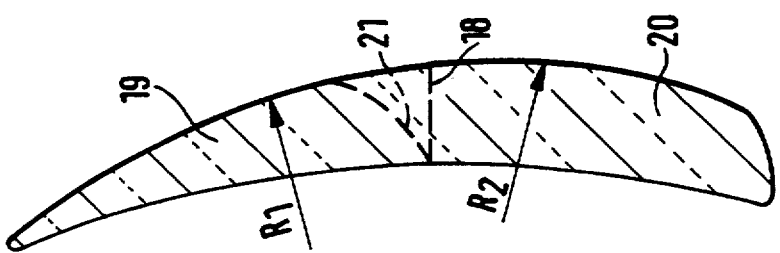
FIG. 4 is a vertical cross-section along line IV—IV of FIG. 3.
Figure 3:
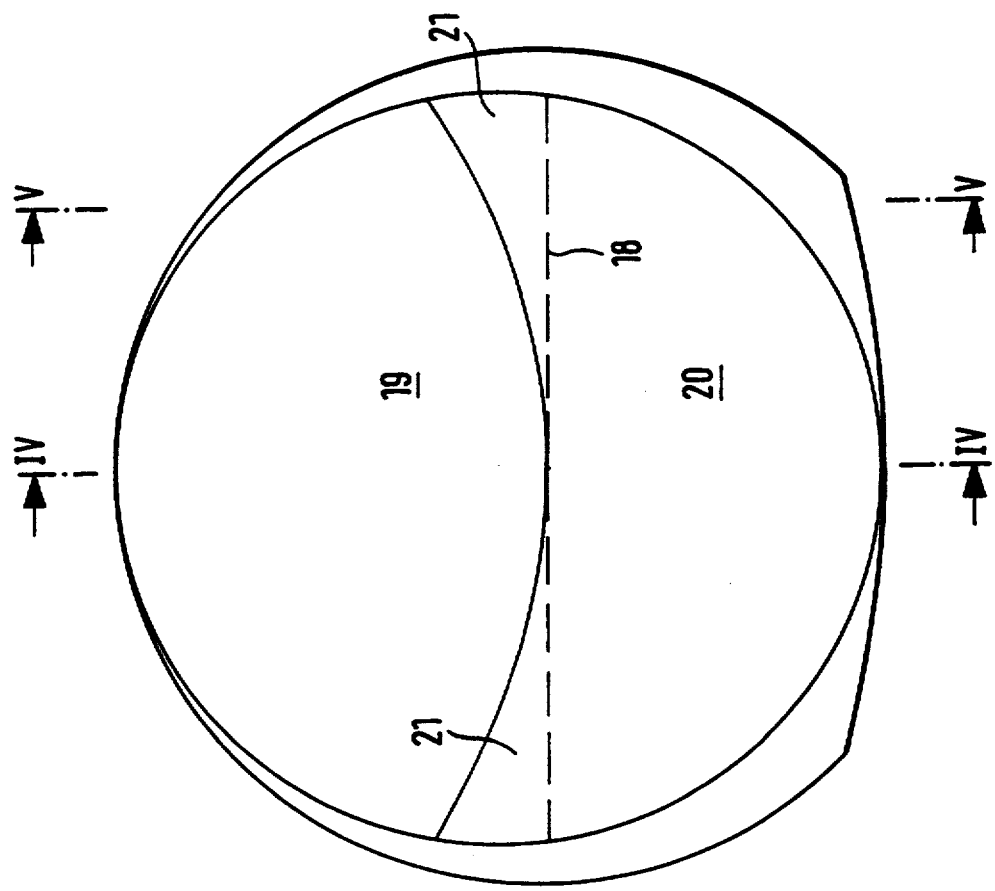
FIG. 3 is a top view of a contact lense according to the invention.

A rotating head stock 2 is provided on a base 1, said head stock being movable on a cross sled along an axis of rotation, as well as in a direction perpendicular to said axis. The rotating head stock 2 is provided with an eccenter head 3 which is supporting a lense holder 4. As can best be seen from FIG. 2, the lense holder 4 is formed as a bar extending along the axis of rotation. Said bar is movable in a direction perpendicular to said axis of rotation. A bore 5 is provided in said lense holder in which a plug, formed like a mushroom and carrying a lense blank, may be inserted. Said plug is locked by an arresting screw 6. A device 23 for adjusting the eccentricity of the position of the lense holder 4 is provided.

In addition, a sled 9 supporting a diamond-tipped cutting tool is provided. Sled 9 is mounted on base 1 in such way that the holder for tool 10 may be pivoted along a radius 11, the center of said radius coinciding with the axis of rotation when the head stock is in its zero position. The holder for the diamond-tipped tool is also adjustable with respect to the axis of rotation 22 of the eccentric head. The cutting edge of the diamond tool 10 is adjusted at the height of the axis of rotation. Drive means 12 for moving the sled 9 perpendicularly with respect to the axis of rotation is provided. As can best be seen from FIG. 1, a starting switch 13 and an off switch 14 are provided for starting and stopping, resp., said drive means 23. The means for pivoting sled 9 comprise a trigger pin 15 which may be positioned in different angular positions and which—in cooperation with said starting and stopping switches 13 and 14, resp.—are actuating said drive means 12. By adjusting the trigger pin 15 the starting position and thereby the height of the zone of the contact lense may be adjusted.

A control 16 is actuated by the output signals of the starting switch 13 and the stopping switch 14 in cooperation with the position of the trigger pin 15. The output of control 16 is connected with the drive means 12 of the sled 9 and the drive means 23 for the adjustment of eccentricity.

In operation, holder 7 with a lense blank 8 is mounted as described above by inserting it into bore 5 of lense holder 4 and secured by arresting screw 6.

Initially, a radius R1 of e.g. 8 mm is adjusted by positioning the diamond-tipped tool 10 on a radius R1 corresponding to the distance from the axis of rotation of the eccentric head. Tool 10 is moved along radius R1 from the top end 17 of the lense blank 8 while the lense blank is rotated by head stock 2. In this way, the distant vision segment 19 of the lense is cut.

Figure 1A:
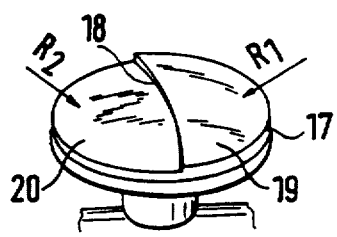
FIG. 1A is a perspective view of a lense having a step-like junction line.

The near vision segment is to have a smaller radius R2 of e.g. 7.5 mm. For this purpose the lense holder 4 on the eccentric head 3 is displaced such that the distance between the lense surface along junction line 18 from the axis of rotation is reduced to 7.5 mm instead of 8 mm as before. Now, sled 9 and diamond tool 10 are displaced toward the center such that the radius is reduced from 8 to 7.5 mm. Subsequently, tool 10 is moved along radius 11 thereby cutting the near vision zone. By this operation a lense as shown perspectively in FIG. 1A is cut, having a partition line 18 between distant vision and near vision segment. While there is no step at the center of the lense, the step is increasing towards the rim of the lense. In the example given above, the height of the step will be 0.137 mm at a lense diameter of 9.6 mm.

To avoid or remove, resp., this step, material is removed by tool 10 in an additional step as will be described in the following:

Along partition line 18, i.e. between the near vision segment 20 and the distant vision segment 19, the radius R2 for the near vision segment is maintained. However, within said predetermined angular region, which extends preferably around 10°, control 16 is controlling the drive means 12 for sled 9 and thereby the diamond tool 10 in such way that the radius is changing continuously, while the tool is pivoted within said predetermined region of about 10° in the direction of the distant vision segment. Thus, at the end of said angular region, radius R2 will be equal to R2 plus the height of the step (i.e. 7.5 +0.137 mm). At the same time as R2 is increased, drive means 23 are actuated by control 16 such that lense holder 4 on eccentric head 3 is displaced by an equal amount. In this way a region 21 is removed from the lense surface which extends laterally from the rim 18 into the predetermined angular region of the distant vision region, thereby blending the surface of the near vision segment 20 into the surface of the distant vision segment. In the center region of the lense the optical quality is maintained. The lateral parts 21 have no influence on the optical quality. Due to the continuous transition zone the cosmetic drawbacks and other disadvantages of the state of the art lenses are overcome.

Figure 1B:
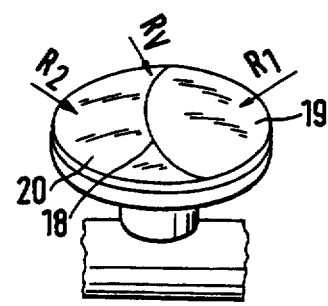
FIG. 1B is a perspective view of a lense without visible junction line according to the invention.
Figure 1:
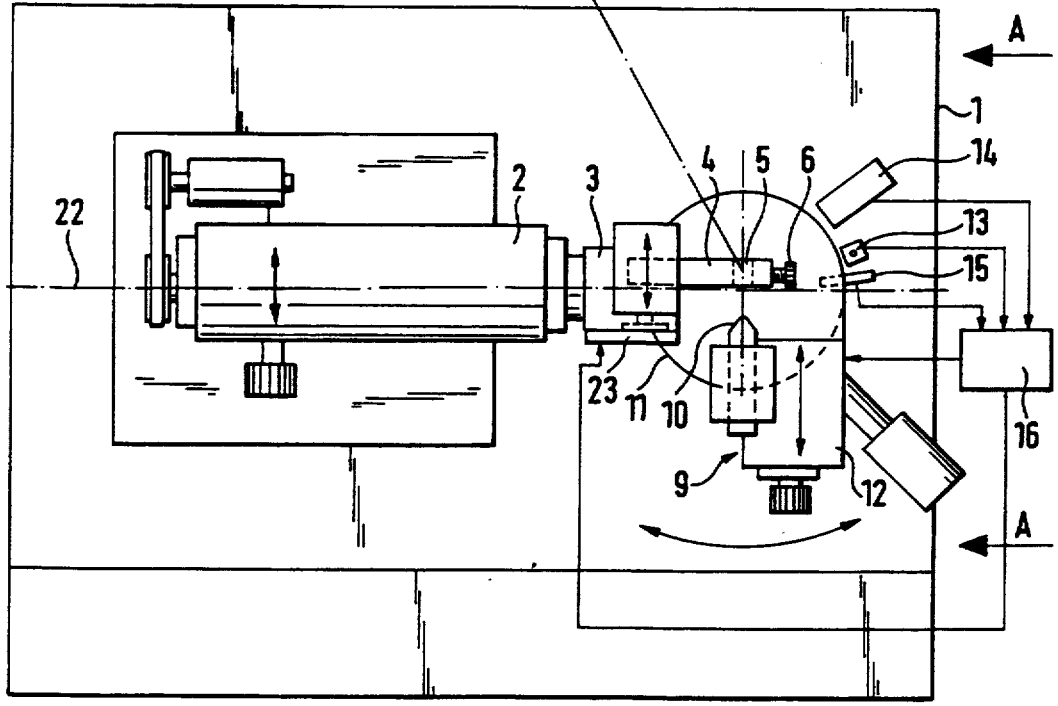
FIG. 1 is a schematic top view of a device for manufacturing contact lenses.

A finished lense having this transition zone is shown in FIG. 1B.

In the above example the adjustment of eccentricity is achieved by automatic control of the drive means. In another embodiment this adjustment may be made by hand.

What is claimed is:

1. A bifocal contact lens comprising
    a lens surface having a center,
    an axis of rotation passing through said center,
    a distant vision segment forming said lens surface on one side of said center, said distant vision segment having a first spherical surface portion with a radius $R_1$ around said axis of rotation,
    a near vision segment forming said lens surface on the other side of said center, said near vision segment having a second spherical surface portion with a radius $R_2$ around said axis of rotation,
    and two curved transition zones extending from said near vision segment into said distant vision segment in an angular region on opposite sides of said center, each transition zone having a radius of curvature changing continuously from said radius $R_1$ at said distant vision segment to said radius $R_2$ at said near vision segment.

* * * * *